July 8, 1958 W. F. BUTLER 2,842,122
FILTER
Filed Aug. 2, 1955 2 Sheets-Sheet 1
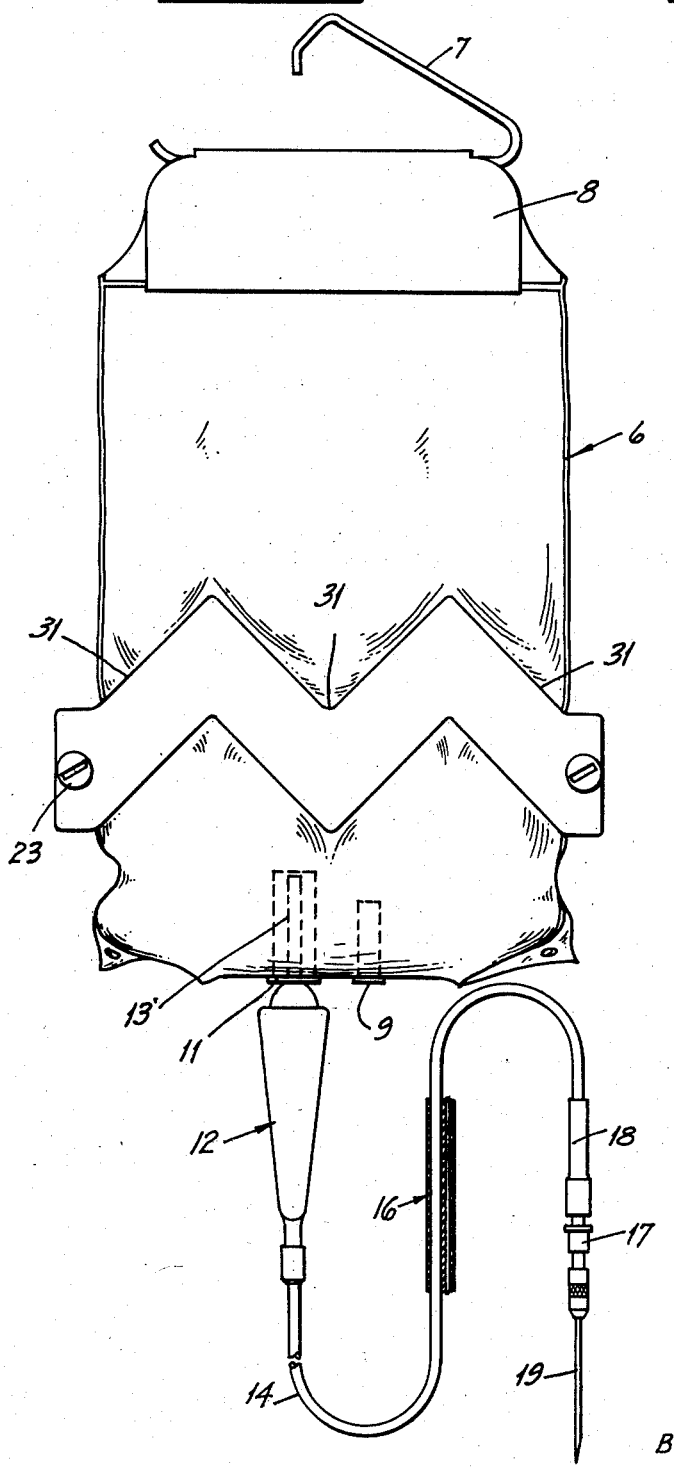
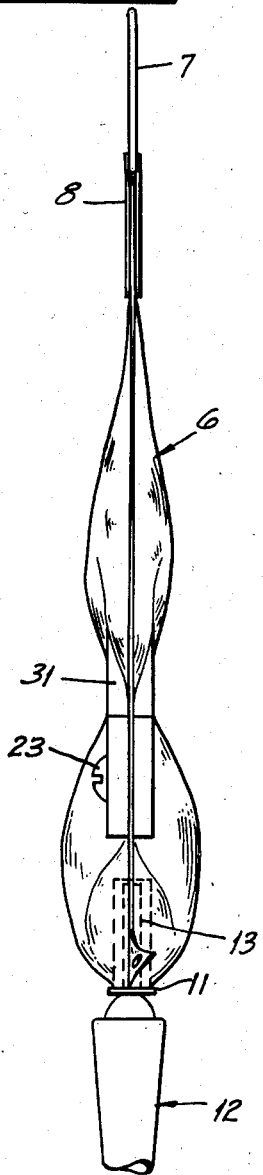
INVENTOR.
William F. Butler
ECKHOFF & SLICK
ATTORNEYS
A MEMBER OF THE FIRM July 8, 1958 W. F. BUTLER 2,842,122
FILTER
Filed Aug. 2, 1955 2 Sheets-Sheet 2
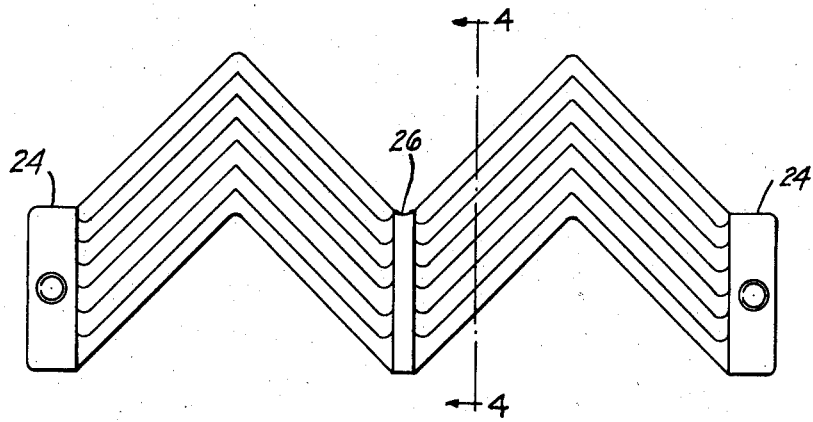
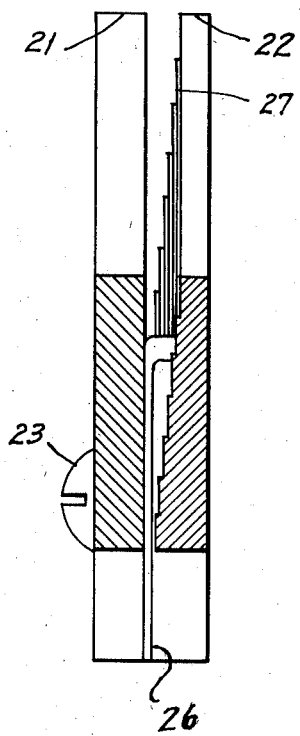
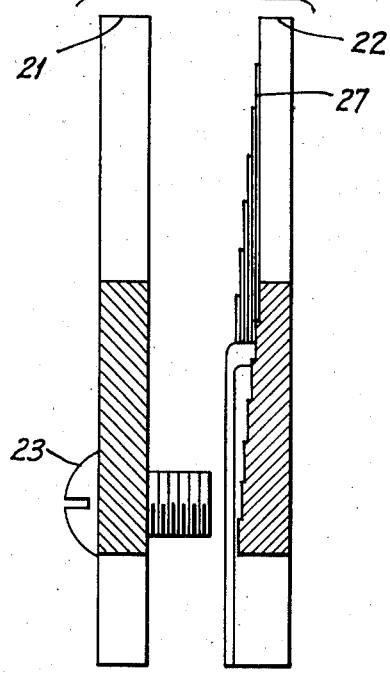
INVENTOR.
William F. Butler
ECKHOFF & SLICK
ATTORNEYS

United States Patent Office 2,842,122
Patented July 8, 1958

2,842,122

FILTER

William F. Butler, Oakland, Calif., assignor to Cutter Laboratories, Inc., a corporation of California Application August 2, 1955, Serial No. 526,014

8 Claims. (Cl. 128—214)

This invention relates to the filtration of fluids and particularly to the filtration of blood contained within a flexible, disposable bag.

It has been disclosed in Patent 2,698,619 that a flexible disposable bag could be provided for the collection and administration of intravenous solutions, particularly blood. It frequently happens that the blood in such a container will have solids present due to coagulation of some portion of the blood. The administration equipment usaully employed includes a filter, tubing and connections providing one or more fine passageways which may become partially closed or clogged with the particles present in the blood with the result that the flow of blood is either reduced or else interrupted.

In accordance with the present invention, I provide means which can be applied to a flexible container and which enables such a container to function as its own filter to the end that the blood permitted to pass from the bag has been effectively freed of particles larger than those of the predetermined size. By causing the blood contained in the flexible container to be filtered and freed of all particles larger than a predetermined size, one can use a simple administration unit including only a drip meter-tubing-needle system for the giving of blood and the use of a filter unit in the system is not necessary.

It is in general the broad object of the present invention to provide a filtering device which can be used with a flexible transparent container for blood and the like.

Another object of the present invention is to provide an improved intravenous solution infusion system in which a flexible container for the fluid to be administered is caused to act as a filter for the material administered.

The invention includes other objects and features of advantage, some of which, together with the foregoing, will appear hereinafter wherein the present preferred form of filter for a flexible container is disclosed.

In the drawings accompanying and forming a part hereof, Figure 1 is a plan view of a completed assembly of a bag, filtering unit and the system required for the giving of a transfusion.

Figure 2 is a side elevation of the completed assembly shown in Figure 1.

Figure 3 is a plan view showing one of the elements utilized in conjunction with the flexible container to provide a filtering element.

Figures 4 and 5 are sections taken along the line 4—4 in Figure 3; in Figure 4, the two plates are shown in a spaced relationship to illustrate details of construction.

Referring to the drawings, I have indicated a flexible, transparent container at 6, this having a hook 7 attached by a paper cover 8 to the upper end of the bag. At its lower end, the bag is provided with an inlet means, generally indicated at 9, and an outlet means, generally indicated at 11. A drip meter, generally indicated at 12, is attached to the outlet 11 by means of its spike 13 inserted through the outlet 11. Attached to the lower end of the drip meter are the other elements of an administration unit comprising a flexible, plastic tube 14, carrying suitable clamp means 16 and having a needle adapter 17 attached to the end of tubing 14 by a length of rubber tubing 18. A needle 19 is positioned on the end of the adapter 17.

The manipulation of the system so far disclosed is well-known in the art. The apparatus shown, however, usually including a filter element in association with the drip meter 12; such a filter is not required with the present invention in which means are provided which, in association and cooperation with bag 6, enable the bag to act as a filter so that the blood passed to the outlet 11 is free of all particles larger than a given size. Thus, I provide a pair of plates 21 and 22 adapted to be joined together at their opposite ends by the screws 23 so that the plates are held in close engagement with the sides of the bag. Plate 21 is preferably flat, while plate 22 is recessed between its opposite terminal ends 24, as will be described. Centrally of plate 22, the plate includes a land 26, which extends outwardly from the recessed portion of the plate and provides a flat surface parallel to the opposite flat face of plate 21. The distance between the face of land 26 and the adjacent face of plate 21 corresponds to the thickness of the two walls of the bag; for example, with a bag wall thickness of 0.016", the clearance between land 26 and the adjacent face of plate 21 is 0.032", so that the bag faces are in engagement in the region between the land 26 and the plate 21. The bag is thus divided into two passageways on each side of land 26 and each of the terminal ends 24 of the plate 22.

Between the land 26 and each of the terminal ends 24 plate 22 is provided with a plurality of recessed faces, these being generally indicated at 27; in the form shown, seven recessed faces are provided, the clearance between the faces and the adjacent face of plate 21 successively decreasing in steps to a final clearance such that the distance between the inside walls of the container, when clamped between the plates 21 and 22, is only from 0.008" to 0.010". Thus, the plates constrict the bag walls and provide a series of slots between the bag walls, each of such narrow width that particles of undesirable size cannot pass between the walls. The successive slots are of decreasing width so the blood is successively subject to filtration through a series of openings of progressively decreasing size.

By applying the plates to the bag above the outlet 11 and with the bag inverted in position, upon suspension of the bag from hook 7 whatever liquid passes the constricted portion of the bag in the area of engagement provided by plates 21 and 22 will pass through a final, slot-like opening having a total width of between 0.008" and 0.012", depending on the actual size of the plates. In this way, the bag acts as its own filter and any particles larger than those of a size larger than the space between the bag walls will be held by the bag wall. The action of the plates and the bag walls in providing the series of slots can be likened to providing a series of screens of increasing fineness which serve to remove coarse particles with a coarse screen and fine particles with a fine screen. In conventional systems as presently utilized, the passage in spike 13 is usually of a diameter of 1/16 inch to 1/8 inch. Blood clots of this size are not uncommon, and in conventional systems one clot lodged over the end of the connector can stop the flow. As blood transfusions are given most frequently in surgery during major operations, this stoppage of flow is very serious and presents a crisis. Now, in using this invention, all blood available at the drip meter connector has been filtered and is clot-free, thus eliminating the possibility of flow stoppages of this nature.

It is preferred to provide the plates in such curved or arcuate form that at least one dwell is provided because plates in this form provide more filter area than do those in which the plates extend in a straight line normal to the longitudinal axis of the bag. Also, the dwell or dwells in such curved plates provide a well or wells for the debris which collects, the passage of the fluid tending to wash the debris toward the bottom of each dwell; in the form shown, I have provided the plates in the form of a W, to provide three dwells 31, but more or less can be provided as desired, and the plates can have a V shape or a U shape, or combinations of these, so that their overall length is substantially greater than the width of the container.

By providing the plates above outlet 11, the filtered fluid collects below the plates and a liquid reservoir is provided above the outlet 11; this is shown in Figures 1 and 2 wherein note the presence of fluid above and below the plates. If for any reason the total flow of fluid past the plates should be discontinued or reduced to a rate below that at which the liquid is issuing from the reservoir, this will be apparent from the decrease in the size of the liquid contained between the plates and the outlet 11. Thus, the administrator will have a visual warning of this condition and can prepare for an emergency.

It is a particular feature of the apparatus shown that the container acts as its own filtering medium and to effect filtration it is not necessary to utilize any equipment which need be sterilized.

I claim:

1. Blood administration equipment comprising a container having flexible walls and opposite ends with an outlet at the lower end, and a pair of plates secured in position upon the container between said ends and constricting the flexible walls of the container and providing a fluid passage between the constricted walls in the form of a slot of such narrow width that the constricted walls act as a filter for blood passing through the slot.

2. Blood administration equipment comprising a container having flexible walls and opposite ends with an outlet at the lower end, and a pair of plates each in the shape of a W and secured in position upon the container between said ends and constricting the flexible walls of the container and providing a fluid passage between the constricted walls in the form of a slot of such narrow width that the constricted walls act as a filter for blood passing through the slot.

3. Blood administration equipment comprising a container having flexible walls and opposite ends with an outlet at the lower end, and a pair of plates secured in position upon the container between said ends and constricting the flexible walls of the container and providing a fluid passage between the constricted walls in the form of a slot of such narrow width that the constricted walls act as a filter for blood passing through the slot, one of said plates having a recessed face providing a plurality of recesses therein to provide a plurality of narrow-slot-like openings between the bag walls when the plates are applied to the bag.

4. Blood administration equipment comprising a container having flexible walls and opposite ends with an outlet at the lower end, and a pair of plates each in the shape of a W and secured in position upon the container between said ends and constricting the flexible walls of the container and providing a fluid passage between the constricted walls in the form of a slot of such narrow width that the constricted walls act as a filter for blood passing through the slot, one of said plates having a recessed face providing a plurality of recesses therein to provide a plurality of narrow slot-like openings between the bag walls when the plates are applied to the bag.

5. Blood administration equipment comprising a container having flexible walls and opposite ends with an outlet at the lower end, and a pair of substantially like curved plates secured in position upon the container between said ends and constricting the flexible walls of the container and providing a fluid passage between the constricted walls in the form of a slot of such narrow width that the constricted walls act as a filter for blood passing through the slot.

6. Blood administration equipment comprising a container having flexible walls and opposite ends with an outlet at the lower end, and a pair of substantially like curved plates secured in position upon the container between said ends and constricting the flexible walls of the container and providing a fluid passage between the constricted walls in the form of a slot of such narrow width that the constricted walls act as a filter for blood passing through the slot, one of said plates having a recessed face providing a plurality of recesses therein to provide a plurality of narrow slot-like openings between the bag walls when the plates are applied to the bag.

7. Blood administration equipment comprising a container having flexible walls and opposite ends with an outlet at the lower end, and a pair of plates secured in position upon the container and providing a fluid passage between the constricted walls in the form of a series of slots, each slot being of successively narrower width so that the gradually constricted walls of the container act as a series of filters of successive fineness for blood passing through the series of successively narrower slots.

8. Blood administration equipment comprising a container having flexible walls and opposite ends with an outlet at the lower end, and a pair of plates having a total length substantially greater than the width of the container and secured in position upon the container and providing a fluid passage between the constricted walls in the form of a series of slots, each slot being of successively narrower width so that the gradually constricted walls of the container act as a series of filters of successive fineness for blood passing through the series of successively narrower slots.

References Cited in the file of this patent

UNITED STATES PATENTS

| 2,656,922 | Jansen | Oct. 27, 1953 |

FOREIGN PATENTS

| 98,041 | Austria | Sept. 25, 1924 |
| 373,608 | Germany | Apr. 13, 1923 |